United States Patent [19]

Brown et al.

[11] Patent Number: 5,311,792
[45] Date of Patent: May 17, 1994

[54] HAND LEVER FOR MOTORCYCLES OR SIMILAR VEHICLES

[75] Inventors: Donald Brown, Thiensville; Richard Donaj, Milwaukee, both of Wis.

[73] Assignee: Harley-Davidson, Inc., Milwaukee, Wis.

[21] Appl. No.: 949,900

[22] Filed: Sep. 23, 1992

[51] Int. Cl.$^5$ .............................................. G05G 11/00
[52] U.S. Cl. ...................................... 74/489; 74/502.2
[58] Field of Search ....................... 74/488, 489, 502.2

[56] References Cited

U.S. PATENT DOCUMENTS

| | | | |
|---|---|---|---|
| 3,176,536 | 4/1965 | Altenburger | 74/502.2 X |
| 3,733,922 | 5/1973 | Tripp | 74/489 X |
| 3,845,847 | 11/1974 | Camp | 74/489 X |
| 3,875,819 | 4/1975 | Haffner | 74/489 |
| 4,307,625 | 12/1981 | Lauzier | 74/489 |
| 4,930,798 | 6/1990 | Yamazaki et al. | 74/489 X |

FOREIGN PATENT DOCUMENTS

| | | | |
|---|---|---|---|
| 736654 | 11/1932 | France | 74/489 |
| 835778 | 12/1938 | France | 74/489 |
| 1033884 | 7/1953 | France | 74/489 |
| 1127746 | 12/1956 | France | 74/489 |
| 2620407 | 3/1989 | France | 74/502.2 |
| 4-133891 | 5/1992 | Japan | 74/489 |

OTHER PUBLICATIONS

Harley-Davidson Accessories Catalog, 1991, p. 78.

*Primary Examiner*—Allan D. Herrmann
*Assistant Examiner*—David W. Laub
*Attorney, Agent, or Firm*—Michael, Best & Friedrich

[57] ABSTRACT

A hand lever for operating a motorcycle clutch or brake is pivotally mounted on one of the motorcycle handgrips and includes a head portion and a handle portion extending away from the head portion. The handle portion has an inner surface facing the handgrip and which is concave in transverse section and an outer surface facing away from the handgrip and which is convex in transverse section. The handle portion is also tapered from its proximal end to its distal end and is pivotal toward the handgrip so that the concave inner surface is moved into proximity with the curvilinear outer handgrip surface.

2 Claims, 1 Drawing Sheet

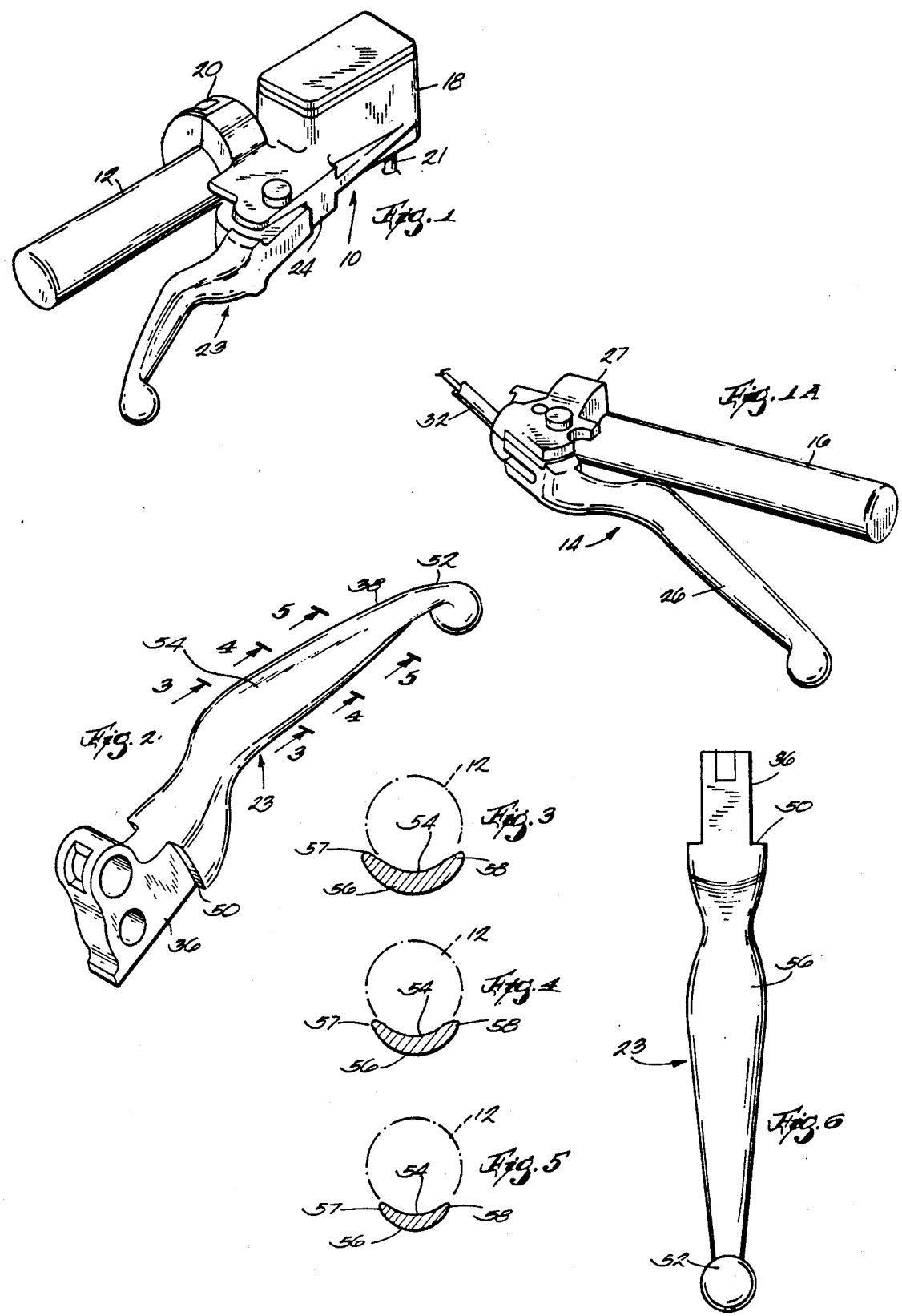

HAND LEVER FOR MOTORCYCLES OR SIMILAR VEHICLES

BACKGROUND OF THE INVENTION

This invention relates to motorcycles and more particularly to motorcycle brake and clutch operating levers.

Prior art operating levers for motorcycles and other vehicles having handgrips for steering generally comprise a head at one end for being pivotally coupled to the handgrip and for being connected to the clutch, brake, or other component being controlled and a handle portion extending from the head portion and adapted to be gripped by the operator. The handle portion of prior art vehicle operating levers are generally rectangular in transverse section and are slightly wider in the center than at each of the opposite ends. The surface of prior art levers facing the handgrip are generally flat or slightly convex so that they were not complementary to the handgrip surface. This limits the degree to which the lever can be moved into proximity with the handgrip, thereby increasing the required finger extension. Furthermore, the shape of prior art handgrips did not conform with the shape of the users fingers, thereby contributing, along with increased finger extension, to operator fatigue and discomfort.

SUMMARY OF THE INVENTION

It is an object of the invention to provide a new and improved operating lever for motorcycles and other vehicles having handgrips.

Another object of the invention is to provide motorcycle operating hand lever which fits more comfortably in an operator's hand.

These and other objects and advantages of the present invention will become more apparent from the detailed description thereof taken with the accompanying drawings.

In general terms, the invention comprises a hand lever for operating a functional component of a vehicle having a pair of handgrips for steering and which are curvilinear in transverse section. The hand lever includes a head portion at one end and which is pivotally mounted on one of the handgrips and a handle portion extending away from the head portion. The handle portion has an inner concave surface facing the handgrip and an outer convex surface away from the handgrip. The sides of the handle portion between the inner and outer surfaces taper inwardly from adjacent its proximal end to adjacent its distal end. The hand lever is pivotable toward the handgrip whereby the concave inner surface is moved into proximity so that the curvilinear outer surface of the handgrip and the convex surface of the hand lever generally define a contour which is generally oval in transverse section.

BRIEF DESCRIPTION OF THE DRAWINGS

FIGS. 1 and 1A are perspectives view of a vehicle handgrip and having operating levers according to the present invention mounted thereon;

FIG. 2 a perspective view of an operating handle according to one embodiment of the invention;

FIG. 3 is a view taken along lines 3—3 of FIG. 2;

FIG. 4 is a view taken along lines 4—4 of FIG. 3;

FIG. 5 is a view taken along lines 5—5 of FIG. 2; and

FIG. 6 is a top view of the operating handle shown in FIG. 2.

DETAILED DESCRIPTION OF THE PREFERRED EMBODIMENT

FIG. 1 shows a motorcycle front brake control 10 mounted on one motorcycle handgrip 12. FIG. 1A shows a motorcycle clutch control 14 mounted on the other handgrip 16.

The front brake control 10 is shown in FIG. 1 to include a master cylinder 18 mounted on the handgrip 12 by means of a clamp 20. The master cylinder is connected by brake line 21 to the motorcycle's front brake caliper (not shown). The hand lever 23, according to one embodiment of the invention, is mounted on a bracket 24 integrally formed on the master cylinder 18 for pivotal movement against an internal return spring (not shown). The operation of the master cylinder 18 and the front brake caliper are well known in the art and, therefore, will not be discussed in detail for the sake of brevity. Such a master cylinder and brake caliper may be found, for example, on HARLEY-DAVIDSON FLT, FXR, and FXS model motorcycles manufactured during the 1989 model year. It will be sufficient for purposes of understanding the invention to state that the operator's palm normally engages the handgrip 12 and his fingers grip the hand lever 23. To effect braking, the lever 23 is pivoted toward the handgrip 12.

The clutch control includes an operating lever 26 pivotally mounted on bracket 27 secured to the other motorcycle handgrip 29. Operating lever 26 is also connected to a clutch control cable 32 whose other end is coupled to the motorcycle clutch (not shown). As an example of a clutch control cable and clutch with which the operating lever 26, according to the invention, may be used, reference is again made to 1989 HARLEY-DAVIDSON FLT, FXR, and FXS model motorcycles.

The brake control hand lever 23 is shown more particularly in FIGS. 2-5 to comprise a head portion 36 and a handle portion 38. The head portion 36 includes an opening 39 for receiving a hinge pin 40 which also extends through openings (not shown) in the bracket 24. In this manner, the lever 23 is pivotally mounted on the bracket 24 for operation of the brake in a well-known manner.

As shown in FIG. 4, the head portion 60 of the clutch hand lever 26 includes a pair of feet 64 for receiving therebetween an eyelet on the clutch control cable 32 and each foot includes an aperture for receiving an anchor pin 69. There is also a hinge 70 formed on the head portion 60. It will be appreciated that pivotal movement of the lever 26 toward and away from the handgrip 16 will operate the clutch (not shown) in a manner well-known in the art.

Referring again to FIGS. 1-5, it can be seen that the handle portion 38 includes a proximal end 50 integral with the head portion and a distal end 52 having a ball 53 formed thereon. The handle portion has an inner surface 54 facing the handgrip 12 and an outer surface 56 facing away from the handgrip 12. There are, in addition, a pair of side surfaces 57 and 58. The handle portion 38 is tapered inwardly along the side surfaces and from adjacent its proximal end to adjacent its distal end. The inner surface 54 is concave in transverse section and the outer surface 56 is convex in transverse section, as shown in FIGS. 3, 4, and 5.

It will be appreciated that in operation, the hand lever 23 is pivotable toward the handgrip 16 whereby the concave inner surface 54 is moved toward the curvilinear outer surface of the handgrip 16 as shown in FIGS. 4–6. This reduces the finger extension required for the operator to clasp the hand lever 26 to the handgrip 16. It can also be seen that the tapered shape of the lever and the convex outer surface conforms more closely to the shape of a user's fingers between the knuckle and the first joint as the user's hand engages the handgrip and the lever. As a result of the shape of the lever, it can be gripped by the operator with less strain than prior art levers.

The configuration of the clutch operating lever 26 is substantially the same as the clutch operating lever 23 except for the head portion 36 of the brake control lever 26, which couples to the master cylinder 18 while the head portion 60 of the clutch control lever 23 includes feet 64 which couple to the clutch control cable 32. Accordingly, the benefits resulting from the configuration of the handle portion 38' of the clutch hand lever 26 are similarly achieved.

Those skilled in the art will appreciate that the hand levers according to the preferred embodiment of the invention may also be employed on other types of vehicles which employ handgrips, such a bicycles, snowmobiles, and the like.

While only a few embodiments of the invention have been illustrated and described, they are not intended to be limited thereby, but only by the scope of the appended claims.

I claim:

1. A hand lever for operating a motorcycle brake, the motorcycle having a handlebar and a pair of handgrips on the opposite ends of the handlebar for steering, the handgrips having a longitudinal axis and being curvilinear in a section transverse to its longitudinal axis, the hand lever including a head portion adjacent one end adapted to be pivotally mounted on the handle bar adjacent one of the handgrips and on the side opposite the other handgrip so that the lever is positioned to be engaged by the operator's fingers, said hand lever also including a handle portion extending away from the head portion and having a proximal end attached to the head portion and a distal end, said handle portion being adapted to be pivoted by the operator's fingers from a normal position in which the distal end is spaced from a handgrip to a second position in which the distal end is adjacent a handgrip, said handle portion having an inner surface adapted to face away from the handgrip and a pair of sides disposed at the junction of the inner and outer surfaces, said handle portion tapering inwardly along said sides from adjacent its proximal end to adjacent its distal end, the inner surface being concave in transverse section and generally linear in the direction extending from adjacent the distal end to adjacent the proximal end to define a generally cylindrical section complimentary to the outer surface of a handgrip, the outer surface of the handle portion being convex in transverse section, said hand lever being adapted to pivot towards a handgrip whereby said concave inner surface is moveable toward proximity with the curvilinear surface of a handgrip, said handle portion being thicker in its center between said edges and tapering to the edges which are relatively thinner than the center whereby the convex outer surface is adapted to define a generally oval configuration with a handgrip in a section transverse to the longitudinal axis of the handle portion when the lever is in close proximity with a handgrip, thereby reducing the finger extension required to operate the motorcycle brake and permitting the operator to exert the required breaking pressure with less effort than if the lever were spaced from a handgrip.

2. A hand lever for operating a motorcycle clutch, the motorcycle having a handlebar and a pair of handgrips on the opposite ends of the handlebar for steering, the handgrips having a longitudinal no axis and being curvilinear in a section transverse to its longitudinal axis, the hand lever including a head portion adjacent one end adapted to be pivotally mounted on the handle bar adjacent one of the handgrips and one the side opposite the other handgrip so that the lever is positioned to be engaged by the operator's fingers, said hand lever also including a handle portion extending away from the head portion and having a proximal end attached to the head portion and a distal end, said handle portion being adapted to be pivoted by the operator's fingers from a normal position in which the distal end is spaced from a handgrip to a second position in which the distal end is adjacent a handgrip, said handle portion having an inner surface adapted to face a handgrip and an outer surface adapted to face away from the handgrip and pair of sides disposed at the junction of the inner and outer surfaces, said handle portion tapering inwardly along said sides from adjacent its proximal end to adjacent its distal end, the inner surface being concave in transverse section and generally linear in the direction extending from adjacent the distal end to adjacent the proximal end to define a generally cylindrical section complimentary to the outer surface of a handgrip, the outer surface of the handle portion being convex in transverse section, said hand lever being adapted to pivot towards a handgrip whereby said concave inner surface is moveable toward proximity with the curvilinear surface of a handgrip, said handle portion being thicker in its center between said edges and tapering to the edges which are relatively thinner than the center whereby the convex outer surface is adapted to define a generally oval configuration with a handgrip in a section transverse to the longitudinal axis of the handle portion when the lever is in close proximity with a handgrip, thereby reducing the finger extension required to operate the motorcycle clutch and permitting the operator to exert the required clutch operating pressure with less effort than if the lever were spaced from a handgrip.

* * * * *

UNITED STATES PATENT AND TRADEMARK OFFICE
CERTIFICATE OF CORRECTION

PATENT NO. : 5,311,792
DATED : May 17, 1994
INVENTOR(S) : Donald Brown, Richard Donaj It is certified that error appears in the above-identified patent and that said Letters Patent is hereby corrected as shown below:

Claim 1, column 3, line 50 after "face" insert --a handgrip and an outer surface adapted to face--.

Signed and Sealed this

Tenth Day of March, 1998

Attest:

BRUCE LEHMAN

Attesting Officer

Commissioner of Patents and Trademarks